United States Patent [19]

Iimura

[11] Patent Number: 5,175,719
[45] Date of Patent: Dec. 29, 1992

[54] APPARATUS FOR DETECTING AN UNRECORDED OPTICAL DISC

[75] Inventor: Shinichiro Iimura, Tokyo, Japan

[73] Assignee: Sony Corporation, Tokyo, Japan

[21] Appl. No.: 689,968

[22] Filed: Apr. 23, 1991

[30] Foreign Application Priority Data

Apr. 27, 1990 [JP] Japan .................................. 2-110511

[51] Int. Cl.⁵ .............................................. G11B 7/00
[52] U.S. Cl. .................................................... 369/58
[58] Field of Search ................................... 369/53–58, 369/32, 47, 44.11

[56] References Cited

U.S. PATENT DOCUMENTS 4,630,252 12/1986 Miura et al. ...................... 369/33 X
5,053,898 10/1991 Hashimoto et al. ............... 369/58 X

FOREIGN PATENT DOCUMENTS

0089021A3  9/1983  European Pat. Off. .
0182127A2  5/1986  European Pat. Off. .
0303936A2  2/1989  European Pat. Off. .
0305049A1  3/1989  European Pat. Off. .
0344994A2* 12/1989  European Pat. Off. .

Primary Examiner—Robert L. Richardson
Attorney, Agent, or Firm—Philip M. Shaw, Jr.

[57] ABSTRACT

An optical recording apparatus for recording desired information signals by an optical head on an optical disc, on which information signals may be optically recorded, is disclosed. The apparatus includes a peak-holding circuit for holding a peak value of reproduced RF signals from the optical head, a bottom-holding circuit for holding a minimum value of the reproduced RF signals, and a decision circuit for deciding if the optical recording disc is an unrecorded disc by comparing the peak value from the peak-holding circuit with the minimum value from the bottom-holding circuit.

6 Claims, 2 Drawing Sheets

APPARATUS FOR DETECTING AN UNRECORDED OPTICAL DISC

BACKGROUND OF THE INVENTION

This invention relates to an optical recording apparatus in which a recordable optical disc is used as the recording medium. More particularly, it relates to an optical disc recording apparatus which is provided with decision means for deciding if the optical disc attached to the optical disc recording apparatus is a pre-recorded optical disc, that is a disk on which information signals have been recorded, or an unrecorded disc.

In the field of recording of information signals, a variety of disc-shaped recording media, such as optical discs or magneto-optical discs, utilizing optical or magneto-optical signal recording/reproducing methods, have been developed and presented to the market. These disc-shaped recording media include read-only-memory (ROM) type recording media, such as compact discs (CDs), write-once type recording media, or which data writing may be made only once by the user, and overwrite type recording media, on which data overwriting may be made, such as magneto-optical discs.

With an optical disc recording/reproducing apparatus for writing or reading out data on or from an optical disc, such as the aforementioned write-once type disc or the overwrite type disc, the rotational speed of a spindle of a disc driving device adapted for rotating the optical disc is controlled for rotating the optical disc at a constant angular velocity or at a constant linear velocity. The optical disc rotated by the disc driving device is irradiated with a laser light from a semiconductor laser enclosed within the optical head, while the return laser light irradiated on and reflected back from the optical disc is detected by a photodetector enclosed within the optical head for recording/reproducing the information on or from the optical disc.

On the other hand, in order that the laser light radiated from the semiconductor laser may be correctly converged on the signal recording surface of the disc and be able to follow the recording track formed on the optical disc in the correct manner, the optical head also performs focusing control and tracking control for the laser light on the basis of the detection output obtained upon detection of the return laser light from the optical disc by the photodetector.

In the case of an optical disc recording apparatus in which the write-once type optical disc is used as the recording medium, if a pre-recorded optical disc is inadvertently attached to the optical disc recording apparatus for recording information signals thereon, without ascertaining in advance if the disc is an unrecorded disc or a pre-recorded disc, the result is that information signals are overwritten on and destroy the pre-recorded information signals.

SUMMARY OF THE INVENTION

It is therefore an object of the present invention to provide an optical disc recording apparatus capable of automatically determining if the optical disc attached to the optical disc recording apparatus is an unrecorded disc or a pre-recorded disc.

It is another object of the present invention to provide an optical disc recording apparatus adapted for inhibiting recording of information signals on a pre-recorded optical disc which is inadvertently attached to the apparatus.

The optical disc recording apparatus according to the present invention is an apparatus in which an optical disc, on which information signals can be recorded, is used as the recording medium. The optical disc recording apparatus includes means for reproducing an RF signal from the optical disk, peak-holding means supplied with the reproduced RF signal for sampling and holding a peak value signal corresponding to a peak amplitude value of the reproduced RF signal, bottom-holding means supplied with the reproduced RF signal for sampling and holding a bottom value signal corresponding to a minimum amplitude value of the reproduced RF signal, and decision means, connected to the peak-holding means and the bottom-holding means, for comparing peak value signal and the bottom value signal, and on the basis of the comparison, determining whether or not the optical disc is an unrecorded disc and outputting a corresponding decision signal.

The above and other objects, features and advantages of the present invention will become more apparent from reading the following preferred description especially in conjunction with the accompanying drawings.

DETAILED DESCRIPTION OF PREFERRED EMBODIMENTS

Figure 1:
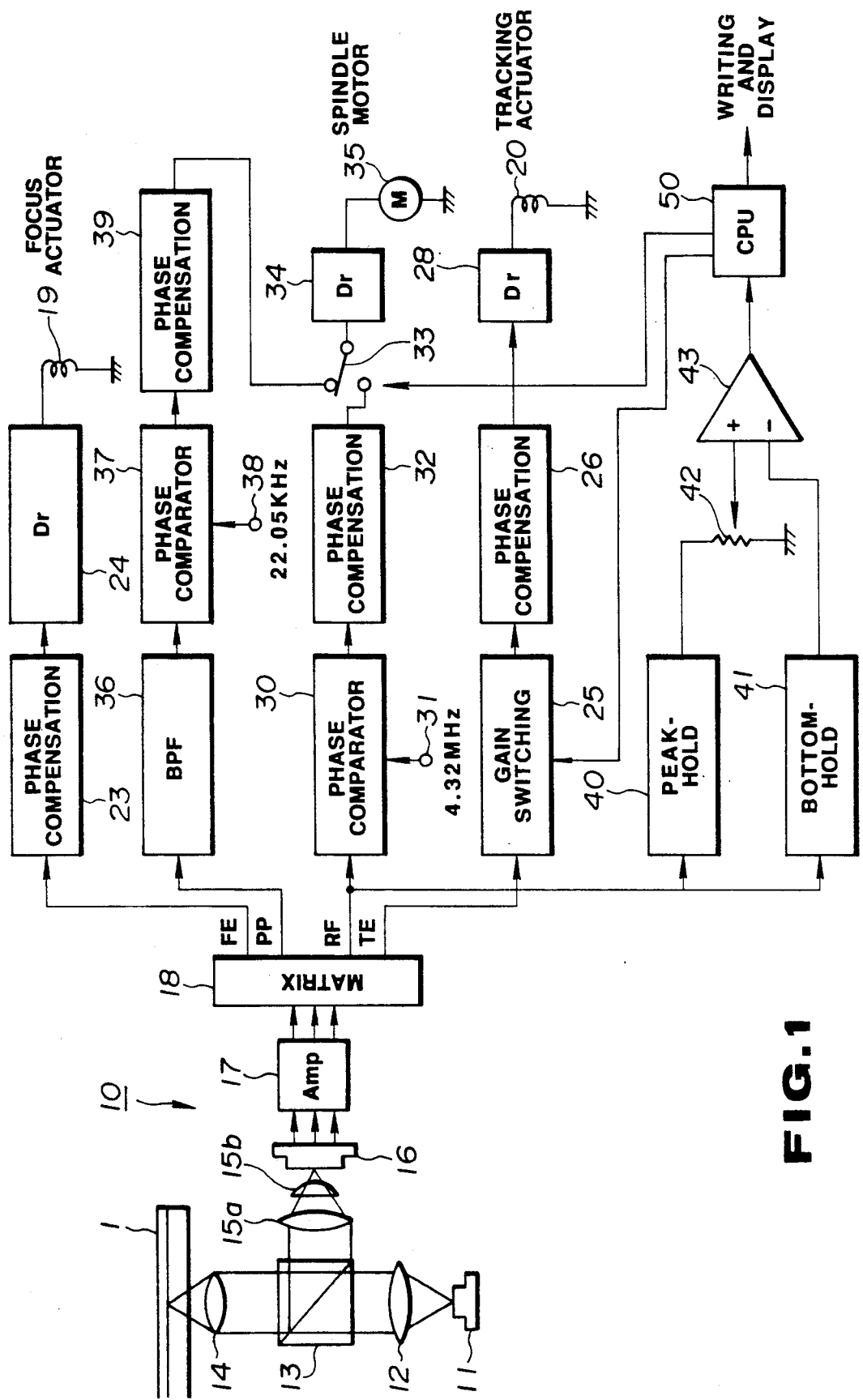
FIG. 1 is a block diagram showing an arrangement of an optical recording apparatus according to the present invention.

The present invention will be hereinafter explained with reference to a preferred embodiment in which it is applied to an optical recording apparatus making use of a write once type optical disc 1 as the recording medium.

With the present optical disc recording apparatus, an optical disc 1 is rotationally driven under a rotational driving force of a spindle motor 35 for scanning a recording track on the disc 1 by a laser beam from an optical head 10 for optically recording digital data according to a predetermined data format.

The optical recording medium, herein the write once type optical disc, may be formed of an organic dye base material or a Te base metallic material.

With the optical head 10 constituting the optical disc recording apparatus, a laser beam radiated from a laser diode 11 as a laser light source is collimated by a collimating lens 12 so as to be converged on the signal recording surface of the optical disc 1 by means of a beam splitter 13 and an objective lens 14.

It is noted that, when recording signals on the optical disc 1, the laser beam radiated from the laser diode 11 is modulated at the laser diode 11 by information signals to be recorded on the optical disc 1 and, when reproducing the signals from the optical disc 1, the laser beam becomes a dc laser beam having an output level lower than that for recording.

The laser beam reflected back from the signal recording surface of the optical disc 1, that is the return laser beam, is reflected by beam splitter 13 and thence transmitted by means of an imaging lens 15a and a cylindrical lens 15b to a photodetector 16 functioning as a light receiving device. It is noted that the objective lens 14 may be moved by a biaxial driving unit, including driving coils 19 and 20, in a direction along the optical axis of the objective lens 14 and in a direction normal to the optical axis, that is along the radius of the optical disc 1. The photodetector 16 is segmented to have four light receiving sections, and light pickup signals from these light receiving section is supplied by means of an amplifier 17 to a matrix circuit 18 where selected sums and differences of the various light pickup signals are taken, in a manner known per se, to produce reproduced RF signals, focusing error signals, tracking error signals or push-pull signals, as output signals.

The focusing error signals (FE signals) from the matrix circuit 18 are supplied by means of a phase compensation circuit 23 and a driving circuit 24 to the driving coil 19 of the biaxial driving unit. By the interaction between the driving coil 19 and a magnet (not shown) provided in opposition to the driving coil 19, the objective lens 14 is moved in a direction along the optical axis, until the focusing error signal is reduced to zero, by way of performing focusing servo in a known manner.

The tracking error signal (TE signal) from the matrix circuit 18 is supplied to the driving coil 20 of the biaxial driving unit by means of a gain switching circuit 25, phase compensation circuit 26 and a driving circuit 28. By the interaction between the driving coil 20 and a magnet (not shown) provided in opposition to the driving coil 20, the objective lens 14 is moved in a direction orthogonal to the optical axis by way of performing tracking servo in a known manner. As the magnet facing the driving coil 20, the aforementioned magnet facing the driving coil 19 may be employed.

The gain switching circuit 25 is controlled by a control signal from a CPU 50 as later described for switching the tracking servo gain between a pre-recorded disc and an unrecorded disc.

The reproduced RF signal from the matrix circuit 18 is the sum signal of the output signals from the light receiving sections, and is transmitted to a phase comparator circuit 30. This phase comparator circuit may be constituted by a phase locked loop (PLL) circuit, as an example, by means of which the phase of a reference clock signal supplied by means of a terminal 31, such as a 4.32 MHz clock signal, is compared with that of a clock signal obtained from the reproduced RF signal of the data recorded on the optical disc 1 for performing phase locking of the PLL and thereby effecting rotational control of the spindle motor 35.

Thus, should there be data previously recorded on the optical disc 1, the output of the phase comparator circuit 30 is passed through a phase compensation circuit 32 and is selected by a switch 33, controlled by the control circuit 50, and is supplied to spindle motor 35 by way of a driving circuit 34 for achieving phase locking of the PLL and thereby effecting rotational control of the spindle motor 35. On the other hand, the push-pull signal or PP signal from the matrix circuit 18, which is produced by a groove wobbled along the radius of the optical disc, is supplied to a bandpass filter or BPF 36 where the 22.5 kHz component, for example, is extracted from the push-pull signal and transmitted to a phase comparator 37. This phase comparator may be constituted, for example, by a PLL, in which the phase of a reference clock signal supplied via terminal 38, such as a 22.05 kHz signal, is compared with that of a clock signal derived from the aforementioned wobbled groove for achieving phase locking of the PLL for effecting rotational control of the spindle motor 35. Thus, should no data be previously recorded on the optical disc 1, the output of the phase comparator 37 by means of a phase compensation circuit 39 is selected by the switch 33 by means of a phase compensation circuit 39 and is supplied to the spindle motor 35 by means of the driving circuit 34 for phase locking the PLL for effecting rotational control of the spindle motor 35.

The reproduced RF signals from the matrix circuit 18 are supplied to a peak holding circuit 40 and a bottom holding circuit 41. The peak holding circuit 40 holds a peak amplitude value P of the reproduced RF signals, while the bottom holding circuit 41 holds the minimum, i.e. a bottom amplitude value B of the reproduced RF signal. The peak value P of the reproduced RF signal is changed in level by a variable resistor 42 so as to be supplied to a positive input terminal of a comparator 43. The bottom value of the reproduced RF signal is supplied to a negative input terminal of the comparator 43. The results of comparison from comparator 43 are supplied to the control circuit 50 constituted by, for example, a micro-computer.

Figure 2:
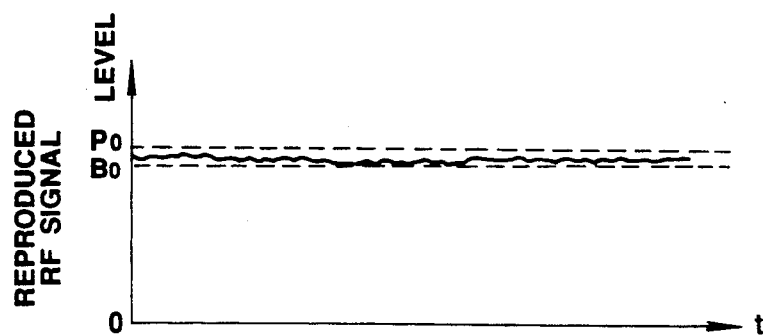
FIG. 2 is a waveform diagram showing the reproduced RF signals obtained from an unrecorded optical disc.
Figure 3:
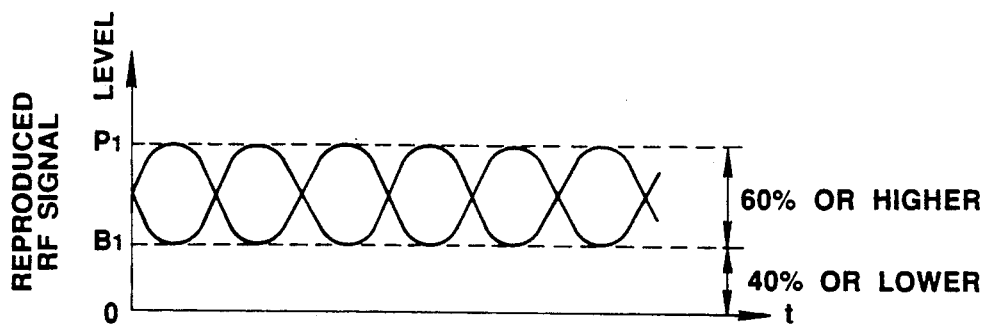
FIG. 3 is a waveform diagram showing the reproduced RF signals obtained from a pre-recorded optical disc.

FIGS. 2 and 3 illustrate waveforms of the reproduced RF signals in which data are recorded and are not recorded on the optical disc 1, respectively.

As shown in FIG. 2, the peak value $P_0$ and the bottom value $B_0$ of the reproduced RF signal obtained from an unrecorded optical disc are approximately equal to each other. On the other hand, with the modulation factor equal to K, the bottom value $B_1$ of the reproduced RF signal obtained from the pre-recorded optical disc is not more than $(1-K)$ times the peak value $P_1$. More concretely, the modulation factor K is set so as to be equal to 0.6 or more, such that, as shown in FIG. 3, the bottom value $B_1$ of the reproduced RF signal is $0.4\,P_1$ or less.

With this in mind, by judging whether or not the data are previously recorded on the optical disc 1 on the basis of the peak value P held in the peak-holding circuit 40 and the bottom value B held in the bottom-holding circuit 40, it becomes possible to prevent mistaken data writing on the pre-recorded optical disc 1.

Reverting to FIG. 1, the peak value P from the peak-holding circuit 40 is decreased by variable resistor 42 to a value equal to $(1-K)$ times or more, which value is then compared in comparator 43 with the bottom value B. If the optical disc is the pre-recorded optical disc, $(1-K)P>B$, the output of the comparator 43 is at a high level (H level). Conversely, if the optical disc is the unrecorded optical disc, $(1-K)P<B$, the output of comparator 43 is at a low level (L level). More concretely, with the modulation factor K equal to 0.6, as above, the peak value P is multiplied by 0.6 at the variable resistor 42 for more sufficient judgment allowance. This value (0.6P) is then compared at comparator 43 with the bottom value B. With the pre-recorded optical disc, $0.6P>B$, such that the output of the comparator 43 is at the H level. Conversely, with the unrecorded optical disc, $0.6P<B$, such that the output of the comparator 43 is at the L level.

Thus, in recording desired information signals on the optical disc 1, if the output of the comparator 43 is at an H level, the control circuit 50 adjudges the disc 1 to be a pre-recorded optical disc or a reproduce-only compact disc, for example, and inhibits data writing, while giving a warning to the user by, for example, a corresponding display. The control circuit 50 also controls the switch 33 to select the output of the phase compensation circuit 32. On the other band, if the output of the comparator 43 is at a low level, the control circuit 50 adjudges the optical disc 1 to be an unrecorded optical disc and permits data writing. The control circuit 50 also performs commutation control to cause the switch 33 to select the output of the phase compensation circuit 39, while controlling the gain of the gain switching circuit 25 of the tracking servo system and controlling the operation of the laser diode 11.

In this manner, it is first determined, at the time of data recording, on the basis of the peak value P held in the peak-holding circuit 40 and the bottom value B held in the bottom-holding circuit 41, whether or not the optical disc 1 attached to the optical disc recording apparatus is a pre-recorded optical disc, and a control operation is so performed that no data is recorded on the pre-recorded optical disc, thereby preventing dual data recording or overwriting on the mistakenly attached pre-recorded optical disc.

It is to be noted that the present invention is not limited to the above described embodiment, but may be readily applied to a magneto-optical disc recording/reproducing apparatus making use of, for example, an overwrite type magneto-optical disc as the recording medium. In this case, in distinction from the above described optical disc recording apparatus, data recording is not inhibited, but the user is apprised of the effect that the disc is a pre-recorded magneto-optical disk, such as by a corresponding display, and data writing is initiated when the user performs the operation for data recording.

The damping factor or the decreasing factor at the variable resistor 42 of the optical disc recording apparatus is not limited to 0.6, as in the above described embodiment, but may be (1−K) or higher. For example, if the modulation factor K is 0.6 or more as in a compact disc, for example, the decreasing factor at the variable resistor 42 is set so as to be equal to 0.4 or more.

What is claimed is:

1. An optical disc recording apparatus employing a recordable optical disc comprising
    means for reproducing an RF signal from the optical disk,
    peak-holding means supplied with the reproduced RF signal for sampling and holding a peak value signal corresponding to a peak amplitude value of the reproduced RF signal,
    bottom-holding means supplied with the reproduced RF signal for sampling and holding a bottom value signal corresponding to a minimum amplitude value of the reproduced RF signal, and
    decision means, connected to the peak-holding means and the bottom-holding means, for comparing the peak value signal and the bottom value signal, and on the basis of the comparison, determining whether or not the optical disc is an unrecorded disc and outputting a corresponding decision signal.

2. The optical recording apparatus according to claim 1 further comprising rotational driving means, controlled by the decision signal, for rotationally driving the optical disc, the rotational driving means being controlled by the decision signal to rotate the optical disk at a first speed or a second speed, depending upon a determination of the determining means whether the optical disk is an unrecorded disk or not.

3. The optical recording apparatus according to claim 2 further comprising
    means for generating a tracking error signal during reproduction of the RF signal from the optical disk, and
    wherein the rotational driving means comprises first rotational driving controlling means including means for deriving clock signals from the reproduced RF signals and means for controlling the rotational driving speed of the optical disc as a function of the clock signals derived from the reproduced RF signals, and second rotational driving controlling means including means for deriving clock signals from the tracking error signal and means for controlling the rotational driving speed of the optical disc as a function of the clock signals derived from the tracking error signal.

4. The optical disc recording apparatus according to claim 3 wherein the rotational driving means further includes switching means controlled by the decision signal for selectively switching between the first rotational driving controlling means and the second rotational driving controlling means.

5. The optical disc recording apparatus according to claim 1 further comprising tracking controlling means for controlling the movement along the radius of the optical disc of a light beam used for recording or reproducing information signals on or from the optical disc, a gain of the tracking controlling means being controlled by the decision means.

6. The optical disc recording apparatus according to claim 1 wherein the decision means further includes amplitude decreasing means connected to the peak-holding means for variably reducing the magnitude of the peak signal to produce a reduced peak value signal corresponding to a reduced amplitude peak signal and wherein the decision means compares the reduced peak value signal with the bottom signal for generating the decision signal.

* * * * *